(12) United States Patent
Kim

(10) Patent No.: US 11,586,007 B2
(45) Date of Patent: Feb. 21, 2023

(54) CAMERA MODULE HAVING A PLURALITY OF SENSING UNITS

(71) Applicant: LG INNOTEK CO., LTD., Seoul (KR)

(72) Inventor: Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 250 days.

(21) Appl. No.: 16/959,358

(22) PCT Filed: Jan. 30, 2019

(86) PCT No.: PCT/KR2019/001291
§ 371 (c)(1),
(2) Date: Jun. 30, 2020

(87) PCT Pub. No.: WO2019/151772
PCT Pub. Date: Aug. 8, 2019

(65) Prior Publication Data
US 2021/0063680 A1   Mar. 4, 2021

(30) Foreign Application Priority Data

Jan. 31, 2018   (KR) .......................... 10-2018-0011806

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
CPC .......... G02B 7/09; G02B 27/646; G03B 5/00; G03B 13/36; G03B 2205/0007;
(Continued)

(56) References Cited

U.S. PATENT DOCUMENTS

| 2009/0284844 A1 | 11/2009 | Koc et al. |
| 2010/0259836 A1 | 10/2010 | Kang et al. |

(Continued)

FOREIGN PATENT DOCUMENTS

| CN | 1162753 A | 10/1997 |
| CN | 1574849 A | 2/2005 |

(Continued)

OTHER PUBLICATIONS

International Search Report dated May 17, 2019 in International Application No. PCT/KR2019/001291.
(Continued)

*Primary Examiner* — Gevell V Selby
(74) *Attorney, Agent, or Firm* — Saliwanchik, Lloyd & Eisenschenk

(57) ABSTRACT

A camera module comprises: a movable lens including a first movable lens movably arranged in an optical axis direction, and a second movable lens arranged under the first movable lens; a fixed lens arranged under the movable lens; a driving unit including a body unit arranged on one side of the movable lens so as to move the movable lens in the optical axis direction; and a sensing unit for detecting the position of the movable lens, wherein the sensing unit respectively comprises: an upper sensing unit arranged on an upper end portion in the optical axis direction of the body unit; and a lower sensing unit arranged on a lower end portion in the optical axis direction of the body unit.

19 Claims, 6 Drawing Sheets

(51) Int. Cl.
*G03B 5/00* (2021.01)
*G03B 13/36* (2021.01)

(58) Field of Classification Search
CPC .... G03B 2205/0046; G03B 2205/0069; G03B 30/00; G03B 17/12; G03B 19/07; H04N 5/2253; H04N 5/2254
See application file for complete search history.

(56) References Cited

U.S. PATENT DOCUMENTS

| | | | |
|---|---|---|---|
| 2013/0009588 A1 | 1/2013 | Kawada | |
| 2019/0064475 A1* | 2/2019 | Kobayashi | H04N 5/2254 |
| 2019/0162562 A1* | 5/2019 | Min | G03B 3/10 |
| 2021/0080682 A1* | 3/2021 | Kobayashi | H04N 5/2254 |
| 2021/0191234 A1* | 6/2021 | Park | H04N 5/2258 |

FOREIGN PATENT DOCUMENTS

| | | | |
|---|---|---|---|
| CN | 101103308 | A | 1/2008 |
| CN | 201489176 | U | 5/2010 |
| CN | 102346347 | A | 2/2012 |
| CN | 105511047 | A | 4/2016 |
| CN | 107076959 | A | 8/2017 |
| JP | 2011-232500 | A | 11/2011 |
| JP | 2013-17309 | A | 1/2013 |
| JP | 2013-167893 | A | 8/2013 |
| KR | 10-2007-0083593 | A | 8/2007 |
| KR | 10-2009-0118192 | A | 11/2009 |
| KR | 10-2010-0048246 | A | 5/2010 |
| KR | 10-1592286 | B1 | 2/2016 |
| KR | 10-2017-0105234 | A | 9/2017 |
| WO | 2017/018727 | A1 | 2/2017 |

OTHER PUBLICATIONS

Supplementary European Search Report dated Oct. 29, 2021 in European Application No. 19747472.9.
Office Action dated Jun. 29, 2021 in Chinese Application No. 201980011332.0.
Office Action dated Feb. 9, 2022 in Chinese Application No. 201980011332.0.
Office Action dated Apr. 13, 2022 in Korean Application No. 10-2018-0011806.

* cited by examiner ary embodiments of this invention relate generally to a camera module.
CAMERA MODULE HAVING A PLURALITY OF SENSING UNITS

CROSS-REFERENCE TO RELATED APPLICATIONS

This application is the U.S. national stage application of International Patent Application No. PCT/KR2019/001291, filed Jan. 30, 2019, which claims the benefit under 35 U.S.C. § 119 of Korean Patent Application No. 10-2018-0011806, filed Jan. 31, 2018, the disclosures of each of which are incorporated herein by reference in their entirety.

TECHNICAL FIELD

The teachings in accordance with exemplary and non-limiting embodiments of this invention relate generally to a camera module.

BACKGROUND ART

Recently, various small electronic devices such as mobile phones and PDAs are marketed mounted with a camera module in order to add functions of digital cameras. As a result, efforts are being continuously waged in order for the said function-added digital cameras to secure a performance almost same as that of conventional digital cameras. Furthermore, high interests are also shown in the lens driving technologies in order to realize a zoom or macro function.

The camera module may be disposed with a plurality of lens groups, each lens group being moved to a mutually distancing direction or to a mutually closing distance to thereby perform a zooming function. However, when a moving distance of lens groups is lengthened, there arises a difficulty in linear control to disadvantageously result in deteriorated control accuracy.

Meantime, in controlling the movement of each lens group, the conventional method was disadvantageously such that each lens group is arranged with only one sensor to allow a signal detected by a Hall sensor to have a longer non-linear section as shown in FIG. 1 when a long stroke, i.e., a movement distance of each lens group is lengthened. As a result, the conventional method suffers from disadvantages in that difficulty arises in controlling the driving of lens groups, or a situation is generated where control itself becomes impossible.

DETAILED DESCRIPTION OF THE INVENTION

Technical Subject

It is an object of the exemplary and non-limiting embodiments of this invention to provide a camera module improved in controllable linearity of a driving unit through a plurality of sensors each mutually spaced apart to an optical axis direction relative to a single moving lens.

Technical Solution

A camera module according to an exemplary embodiment may comprise:
a movable lens including a first movable lens movably arranged in an optical axis direction, and a second movable lens arranged under the first movable lens;
a fixed lens arranged under the movable lens;
a driving unit including a body unit arranged on one side of the movable lens so as to move the movable lens in the optical axis direction; and
a sensing unit for detecting the position of the movable lens, wherein the sensing unit respectively comprises:
an upper sensing unit arranged on an upper end portion in the optical axis direction of the body unit; and
a lower sensing unit arranged on a lower end portion in the optical axis direction of the body unit.

The sensing unit may include a sensing magnet disposed on the body unit, and a sensor so disposed as to be spaced apart from the sensing magnet to an optical axis direction.

The driving unit may include a guide rail extensively formed along an optical axis direction, and a guide unit disposed on the body unit to slide along the guide rail.

The guide unit may include a guide wheel formed with a recessed unit to correspond to an outer circumferential surface of the guide rail.

The guide rail may take a rod shape in cross-section thereof, and the guide unit may be a pair of balls disposed along a circumference of the guide rail.

The driving unit may include a driving magnet disposed at one side of the body unit, and a driving coil disposed opposite to the driving magnet.

The camera module may further comprise a yoke disposed at an outside of the driving coil.

The body unit may be disposed at a lower end with a downwardly protruded stopper, and the driving unit may include a first driving unit coupled to one side of the first movable lens to move the first movable lens to an optical axis direction, and a second driving unit disposed at one side of the second movable lens to move the second movable lens to an optical axis direction.

The driving unit may include a first driving unit coupled to one side of the first movable lens to move the first movable lens to an optical axis direction, and a second driving lens coupled to one side of the second movable lens to move the second movable lens to an optical axis direction.

The first driving unit may include a first guide rail extensively formed along an optical axis direction to guide a first guide unit disposed on the body unit of the first driving unit, and the second driving unit may include a second guide rail extensively formed along an optical axis direction to guide a second guide unit disposed on a body unit of the second driving unit.

A camera module according to another exemplary embodiment may comprise:
a movable lens including a first movable lens movably disposed to an optical axis direction and a second movable lens disposed underneath the first movable lens;
a fixed lens disposed underneath the movable lens;
a first driving unit coupled to one side of the first movable lens to move the first movable lens to an optical axis direction;
a second driving unit coupled to one side of the second movable lens to move the second movable lens to an optical axis direction;
a first sensing unit disposed at an upper side of the first driving unit;
a second sensing unit disposed at a lower side of the first driving unit;
a third sensing unit disposed at an upper side of the second driving unit; and
a fourth sensing unit disposed at a lower side of the second driving unit.

Advantageous Effects

The present exemplary embodiment may provide advantageous effect in that a plurality of sensors, each mutually spaced apart from a single movable lens to an optical axis direction, can be disposed to increase linearity of an output of a Hall sensor.

Furthermore, the present exemplary embodiment may provide advantageous effect in that control easiness of a lens driving unit can be improved in response to an increased controlled linear section.

Still furthermore, the present exemplary embodiment may provide advantageous effect in that accuracy and resolution of a driving unit can be improved in response to improved performance at an application end.

Still furthermore, the present exemplary embodiment may provide advantageous effect in that software calibration can be eased in response to decreased non-linear sections.

BEST MODE

Figure 1:
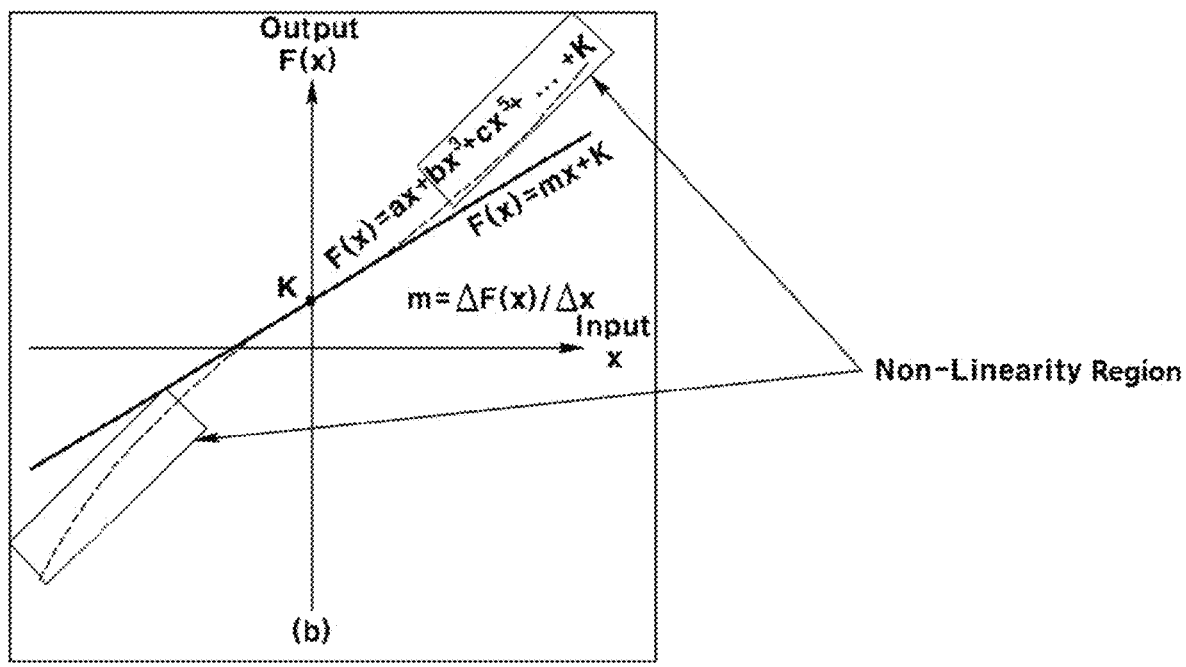
FIG. 1 is a graph showing a non-linear characteristic of a Hall sensor output of a camera module according to prior art.

Hereinafter, reference will now be made in detail to some of the preferred embodiments of the present invention, examples of which are illustrated in the accompanying drawings. In describing a reference numeral for each element, a same reference numeral will be designated, if possible, for the same element, albeit being differently indicated on other drawings.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art.

In describing elements in the exemplary embodiments of the present invention throughout the specification and claims, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

Therefore, the exemplary embodiments and constructions in the drawings described in the present specification are merely preferred exemplary embodiments of the present invention, and do not represent all the technical ideas of the present invention, such that it should be interpreted that there are various equivalents and modifications that may replace the same at the time of filing the present invention. Furthermore, in the following description, well-known functions or constructions are not described in detail to avoid obscuring the present invention in unnecessary detail.

Hereinafter, a lens group most closely disposed with a subject may be explained as "a first group lens" or "a first group", while, conversely, a lens group most closely disposed with an image sensor may be explained as "a third group lens", or "a third group", and a lens group interposed between a first group lens and a third lens may be explained as "a second group lens", or "a second group".

Hereinafter, the first group lens may be explained as "a first movable lens", a second group lens may be explained as "a second movable lens", and a third lens may be explained as "a fixed lens".

Furthermore, a direction parallel with an optical axis of a lens may be explained as "an optical axis direction" or "up/down direction", a direction of a light being incident on a lens in an optical axis direction may be explained as "upward", "upper side" or "front side", and conversely, a direction of a light incident through a lens and captured by an image sensor may be explained as "downward,", "lower side" or "rear side".

Although a total of respectively-controlled three lens groups in the present exemplary embodiment may be explained as a third group lens, the present invention is not limited to the said description, and it should be apparent that the description may be applicable to a second group lens or lens of more than fourth group.

The present exemplary embodiment relates to a camera module configured to perform a zoom(ing) function. A camera module performing the said zooming function may be applicable to various optical devices.

An optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and the optical device may include any device capable of capturing an image or a photograph.

The optical device may include a body unit. The body unit may form an external shape of an optical device. The body unit may accommodate a camera module. One surface of body unit may be disposed with a display unit. For example, one surface of the body unit may be disposed with a display unit and a camera module and the other surface (surface opposite to the said one surface) of the body unit may be additionally disposed with a camera module.

An optical device may include a display unit. The display unit may be disposed on one surface of the body unit. The display unit may output an image captured by a camera module. The optical device may include a camera module. The camera module may be disposed on a body unit. At least a part of the camera module may be accommodated into the body unit. The camera module may be disposed in a plural number. The camera module may be respectively disposed on one surface of the body unit and on the other surface of body unit. The camera module may capture or photograph an image of a subject.

The camera module may perform an AF (Auto Focus) function. The camera module may perform an AF feedback (Auto Focus Feedback) control. At this time, the camera module may be called as a 'CLAF (Closed Loop Auto Focus) camera module'. The camera module may perform a handshake correction (OIS, Optical Image stabilization)

function. At this time, the camera module may be called as an 'OIS module'. The camera module may perform an OIS feedback control. The camera module according to an exemplary embodiment may perform a zooming function.

Now, a camera module according to an exemplary embodiment of the present invention will be described in detail with reference to the accompanying drawings.

Figure 2:
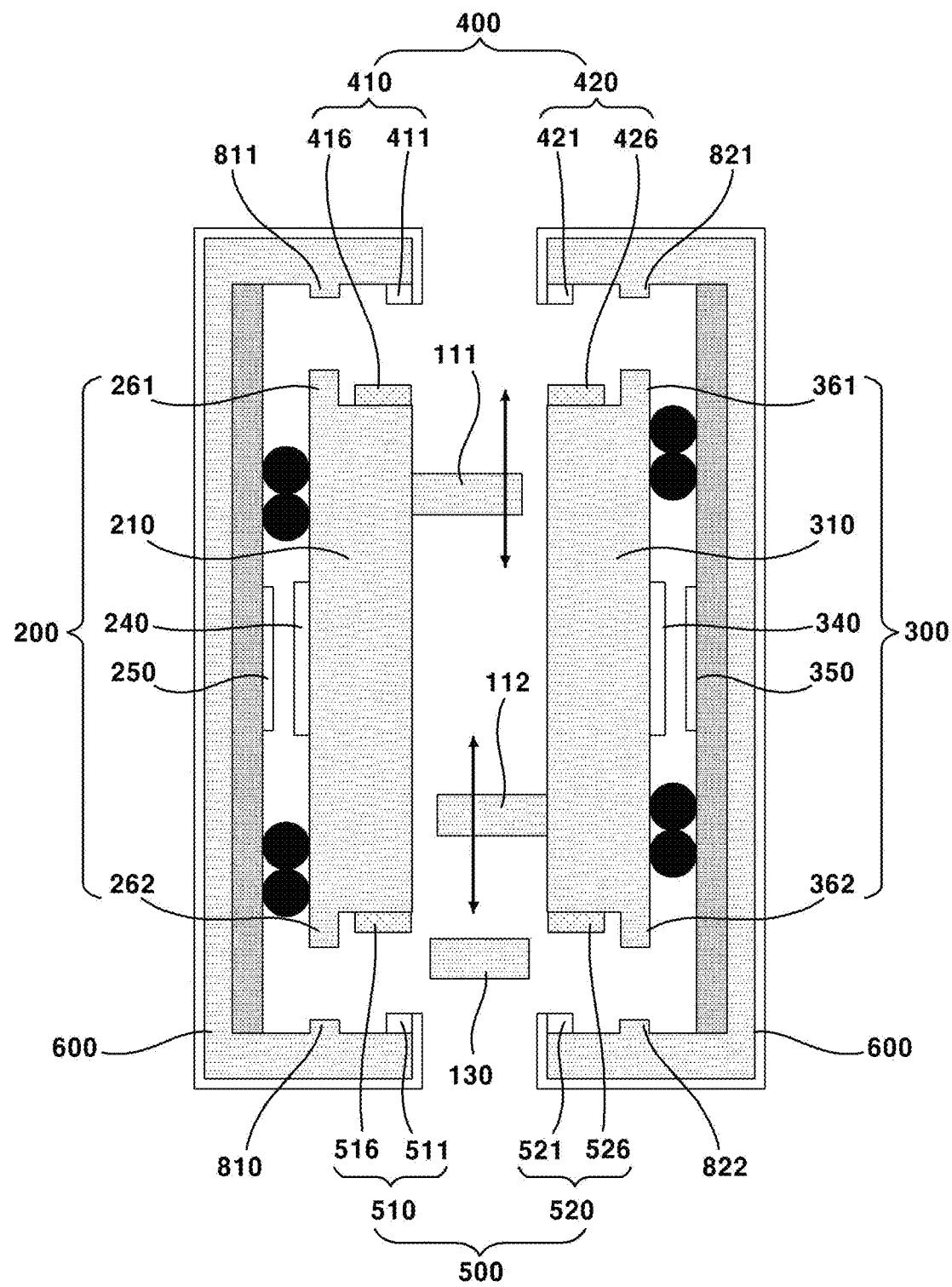
FIG. 2 is a schematic cross-sectional view of a camera module according to an exemplary embodiment of the present invention.
Figure 3:
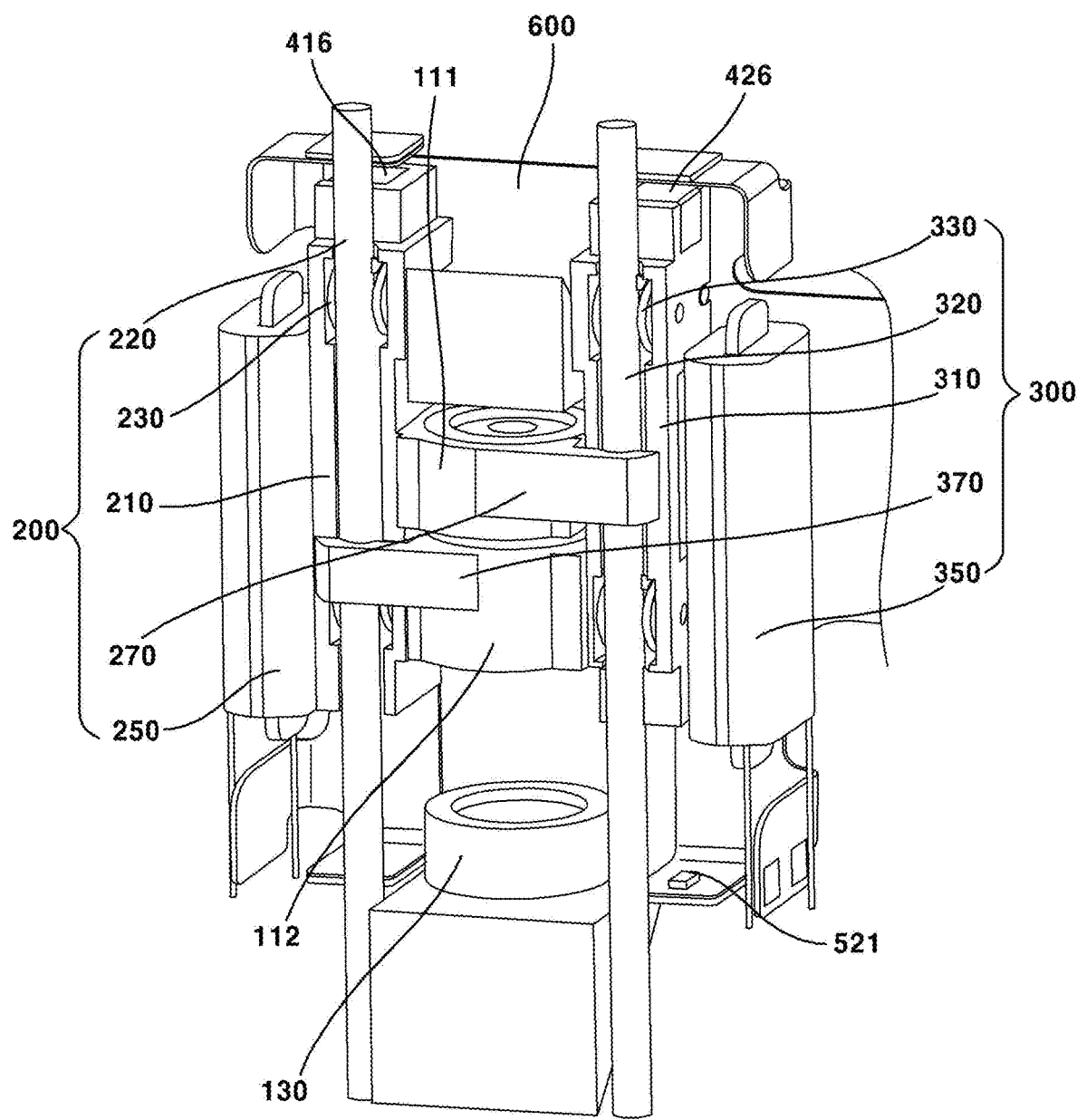
FIG. 3 is a perspective view of a camera module according to an exemplary embodiment of the present invention.
Figure 4:
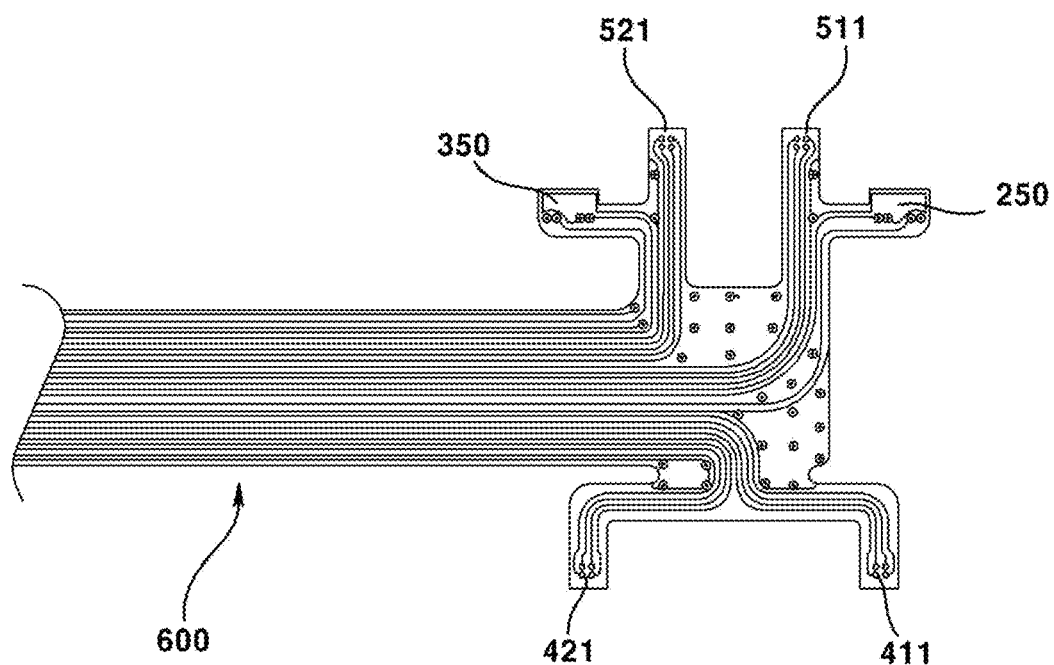
FIG. 4 is a schematic view illustrating a first substrate of a camera module according to an exemplary embodiment of the present invention.
Figure 5:
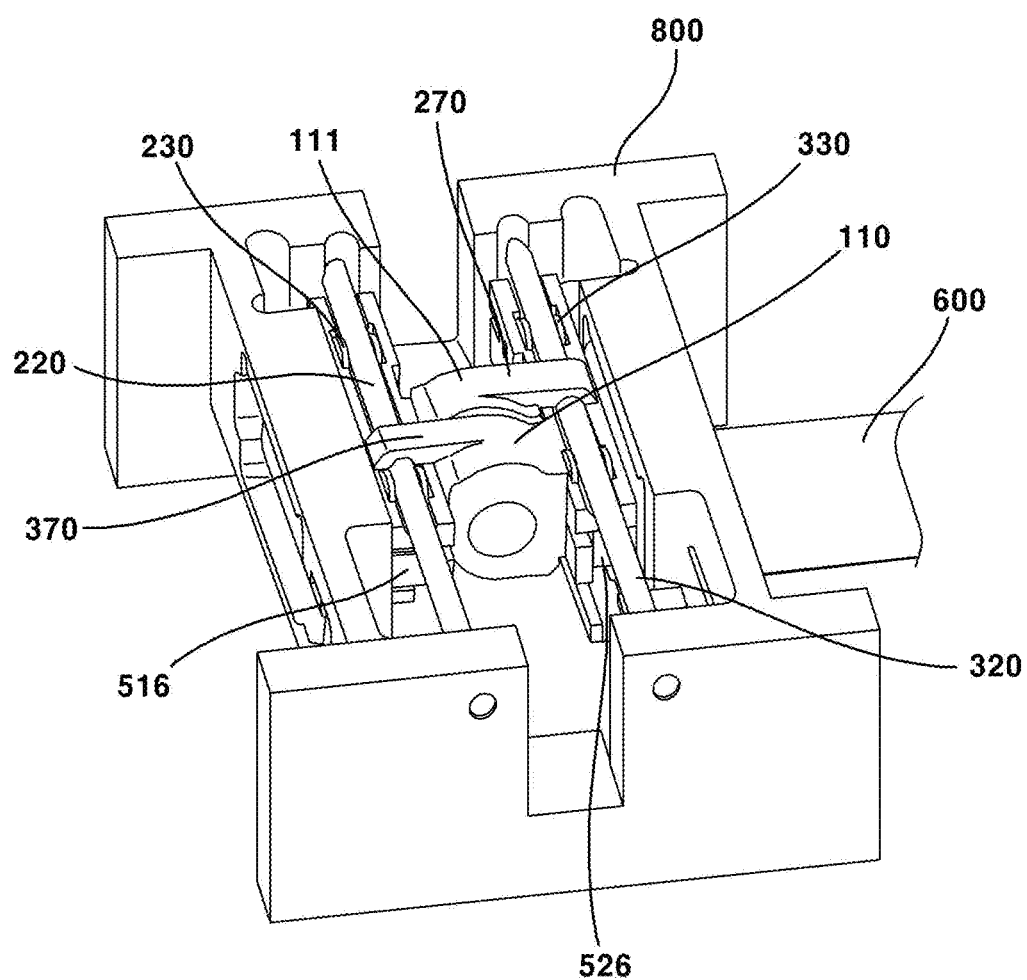
FIG. 5 is a schematic view illustrating a coupled state of a fixed member of a camera module according to an exemplary embodiment of the present invention.

FIG. 2 is a schematic cross-sectional view of a camera module according to an exemplary embodiment of the present invention, FIG. 3 is a perspective view of a camera module according to an exemplary embodiment of the present invention, FIG. 4 is a schematic view illustrating a first substrate (600) of a camera module according to an exemplary embodiment of the present invention, and FIG. 5 is a schematic view illustrating a coupled state of a fixed member (800) of a camera module according to an exemplary embodiment of the present invention.

The present exemplary embodiment relates to a camera module configured to perform a zooming function, and the camera module according to the present exemplary embodiment may include a movable lens (110), a fixed lens (130), a driving unit (200,300), and a sensing unit (400,500).

The camera module may include a movable lens (110). The movable lens (110) may move to an optical axis direction in order to perform a zooming function. The movable lens (110) according to the present exemplary embodiment may include a first movable lens (111) incident of a light reflected from a subject and a second movable lens (112) disposed at a lower side of the first movable lens (111) to perform a zooming function by relatively moving to an optical axis direction relative to the first movable lens (111) moving to an optical axis direction.

The movable lens (110) may include a first movable lens (111). The first movable lens (111) may move to an optical axis direction. The first movable lens (111) may include a lens of at least one or more sheets. The first movable lens (111) may include a lens and a barrel. The said at least one or more sheets of lens may be disposed inside of the barrel. The first movable lens (111) may be coupled with a driving unit. The first movable lens (111) may be moved to an optical axis direction by the driving unit. The first movable lens (111) may be coupled with a first driving unit (200). The first movable lens (111) may be moved to an optical axis direction by the first driving unit (200). The camera module may be disposed with separate sensing units each spaced apart to an optical axis direction of the first movable lens (111). An upper end to an optical axis direction of the first movable lens (111) may be disposed with a first sensing unit (410), and a second sensing unit (510) may be disposed at a lower end. To be more specific, the first sensing unit (410) may be disposed at an upper side of the first driving unit (200) and the second sensing unit (510) may be disposed at a lower side of the first driving unit (200). As illustrated in FIG. 3, one side of the first movable lens (111) may be coupled by the first driving unit (200) and the other side may be formed with a first coupling member(270), which may be guided along a second guide rail (320, described later) by the first coupling member (270).

The movable lens may include a second movable lens (112). The second movable lens (112) may be disposed at a lower side of the first movable lens (111). The second movable lens (112) may perform a zooming function by moving to the first movable lens (111) relative to an optical axis direction. The second movable lens (112) may be moved to an optical axis direction. The second movable lens (112) may include a lens of at least one or more sheets. The second movable lens (112) may include a lens and a barrel. The said at least one or more sheets of lens may be disposed inside of the barrel. The second movable lens (112) may be coupled with a driving unit. The second movable lens (112) may be moved to an optical axis direction by the driving unit. The second movable lens (112) may be coupled with a second driving unit (300). The second movable lens (112) may be moved to an optical axis direction by the second driving unit (300). The camera module may be disposed with separate sensing units each spaced apart to an optical axis direction of the second movable lens (112). An upper end to an optical axis direction of the second movable lens (112) may be disposed with a third sensing unit (420), and a fourth sensing unit (520) may be disposed at a lower end. To be more specific, the third sensing unit (420) may be disposed at an upper side of the second driving unit (300) and the fourth sensing unit (520) may be disposed at a lower side of the second driving unit (300). As illustrated in FIG. 3, one side of the second movable lens (112) may be coupled by the second driving unit (300) and the other side may be formed with a second coupling member (370), which may be guided along a first guide rail (220, described later) by the second coupling member (370).

That is, the movable lens may be further securely supported by moving and being respectively coupled by a driving unit and a guide rail each disposed at a mutually symmetrical position about an optical axis direction.

The camera module may include a fixed lens (130). The fixed lens (130) may be fixedly disposed at an inside of the camera module. The fixed lens (130) may be disposed at a lower side of the second movable lens (112). The fixed lens (130) may perform a zooming function by being disposed at a lower side of the first and second movable lens (111, 112) each moving to an optical axis direction. The fixed lens (130) may include a lens of at least one or more sheets. The fixed lens (130) may include a lens and a barrel. The lens of at least one or more sheets may be disposed at an inside of the barrel. As illustrated in FIG. 3, the fixed lens (130) may be interposed between the first driving unit (200) and the second driving unit (300). The fixed lens (130) may be explained as being interposed between a first guide rail (220, described later) and a second guide rail (320, described later).

The camera module may include a driving unit (200,300). The driving unit (200,300) may move the said first movable lens (111) and the second movable lens (112) to an optical axis direction. The driving unit may include a first driving unit (200) coupled to the first movable lens (111) to move the first movable lens (111) to an optical axis direction. The driving unit may include a second driving unit (300) coupled to the second movable lens (112) to move the second movable lens (112) to an optical axis direction. The driving unit (200,300) may include a body unit (210,310) coupled to the movable lens (110) to be moved to an optical axis direction, a guide rail (220,320) configured to guide the body unit (210,310) and a guide unit (230,330) disposed at one side of the body unit (210,310) to slide along the guide rail (220,320). Furthermore, the driving unit (200,300) may be disposed with a driving magnet (240,340) disposed at one side of the body unit (210,310) and a driving coil (250,350) so disposed as to face the driving magnet (240,340). The zooming function may be performed through the magnetic field of the driving magnet (240,340) and a current of the driving coil (250,350) according to Fleming's left hand rule. The driving coil (250,350) may be disposed on a fixed member (800, described later) so as to face the driving magnet (240,340).

The driving unit (240,340) may include a body unit (210,310). The body unit (210,310) may be coupled with the movable lens (110) to move the movable lens (110) to an optical axis direction. The body unit (210,310) may be lengthily extended to an optical axis direction. The body unit (210,310) may take a cubic shape extensively formed to an optical axis direction, but the present invention is not limited thereto. An upper end of the body unit (210,310) may be formed with an upper stopper (261,361) upwardly protruded to restrict an upward movement of the movable lens (110). A lower end of the body unit (210,310) may be formed with a lower stopper (262,362) downwardly protruded to restrict a downward movement of the movable lens (110). One lateral surface of body unit (210,310) may be coupled by the movable lens (110). The other one lateral surface of body unit (210,310) may be disposed with a guide unit (230,330). At this time, the guide unit (230,330) may be formed in a plural number each vertically spaced apart. The guide unit (230,330) may slide along the guide rail (220,320) to guide the body unit to an optical axis direction. An upper side of the body unit (210,310) may be disposed with an upper sensing unit. A lower side of the body unit (210,310) may be disposed with a lower sensing unit. The driving unit may include a first driving unit (200) coupled with the first movable lens (111) and a second driving unit (300) coupled with the second movable lens (112). An upper end of body unit at the first driving unit (200) may be disposed with a first sensing unit (410), and a lower end may be disposed with a second sensing unit (510). An upper end of body unit at the second driving unit may be disposed with a third sensing unit (420), and a lower end may be disposed with a fourth sensing unit (520). That is, separate sensing units may be respectively disposed vertical of the driving unit to allow a sensing unit of the other side to compensate an output of sensing unit at any one side, whereby an output of sensor can be linearly shown and a linear control of the movable lens can be implemented.

One lateral surface of body unit may be disposed with a guide unit (230,330). The guide unit (230,330) may include at least one unit and when the guide unit is formed in a plural number, each of the guide units (230,330) may be vertically spaced apart to an optical axis direction. The guide unit (230,330) may slide along an outer circumferential surface of guide rail (220,320) to guide the movement of body unit. The guide unit (230,330) may take a wheeled guiding shape. The guide wheel may be disposed with a recessed unit inwardly recessed to correspond to an outer circumferential surface of the guide rail (220,320). The recessed unit may be contacted by an outer circumferential surface of guide rail (220,320) to be guided to an optical axis direction. The guide unit (230,330) may take a sphered guide ball shape. The guide ball may be formed in a pair and the pair of guide balls may be disposed about a circumference of the guide rail (220,320).

Moreover, an upper side of the body unit (210,310) may be disposed with an upper sensing unit (400), and a lower side may be disposed with a lower sensing unit (500). To be more specific, an upper side of the body unit (210,310) may be disposed with a sensing magnet (416,426) of upper sensing unit (400), and a Hall sensor (411,421) of upper sensing unit (400) may be so disposed as to be spaced apart to an upper side of optical axis direction. A lower side of the unit body (210,310) may be disposed with a sensing magnet (516,526) of lower sensing unit (500), and a Hall sensor (511,521) of lower sensing unit (500) may be spaced apart to a lower side of optical axis direction. That is, separate sensing units may be respectively disposed vertical of the driving unit to allow a sensing unit of the other side to compensate an output of sensing unit at any one side, whereby an output of sensor can be linearly shown and a linear control of the movable lens (110) to an optical axis directional movement can be implemented.

The driving unit may include a guide rail (220,320). The guide rail (220,320) may be so formed as to be lengthily extended along an optical axis direction. The guide rail (220,320) may be disposed parallel with an optical axis. A cross-section of the guide rail (220,320) may take a round rod shape, but the present invention is not limited thereto. An upper end and a lower end of the guide rail (220,320) may be respectively coupled to a fixed member (800, described later). The guide rail (220,320) may include a first guide rail (220) parallel with an optical axis and formed at one side about a lens, and a second guide rail (320) formed at the other side. As shown in FIG. 3, the first guide rail (220) may guide a guide unit (230) disposed on the body unit (210) of the said first driving unit (200) and may guide the second coupling member (370) disposed on the second movable lens (112) as well. The second guide rail (320) may guide the guide unit (330) disposed on the body unit (310) of the second driving unit (300) and guide the first coupling member (270) disposed on the first movable lens (111) as well. That is, both sides perpendicular to each optical axis of the first movable lens (111) and the second movable lens (112) may be simultaneously guided to each guide rail mutually disposed at a different direction to thereby allow a stronger support to the movement thereof.

The driving unit (200,300) may include a driving magnet (240,340). The driving magnet (240,340) may be disposed at another lateral surface of body unit (210,310). The driving magnet (240,340) may be so formed as to be lengthily extended to an optical axis direction. The driving unit may include a driving coil (250,350). The driving coil (250,350) may be spaced apart from the driving magnet (240,340). The driving coil (250,350) may be so disposed as to face the driving magnet (240,340). The driving coil (250,350) may be disposed at an inside of the fixed member (800, described later). The driving coil (250,350) may be fixedly coupled with the fixed member (800). An outside of the driving coil (250,350) may be disposed with a yoke (700). The driving coil (250,350) may be disposed on the yoke (700). The driving coil (250,350) may be applied with a driving current. A current-flowing driving coil (250,350) may be disposed in a magnetic field formed by the driving magnet (240,340) to generate a predetermined level of force according to Fleming's left hand rule, whereby the body unit (210,310) of driving unit may be moved by the force thereof.

The camera module may include a sensing unit (400,500). The sensing unit may include a sensing magnet (416,426, 516,526) and a sensor (411,421,511,521). The sensing magnet (416,426,516,526) may be disposed on the body unit (210,310) of the driving unit. The sensor (411,421,511,521) may be so disposed as to face the sensing magnet (416,426, 516,526). The sensor (411,421,511,521) may be a Hall sensor. The sensor (411,421,511,521) may be disposed on the fixed member (800). The sensor (411,421,511,521) may be disposed on a PCB (Printed Circuit Board). The sensor (411,421,511,521) may be disposed at an inside of the fixed member (800) while being formed on the PCB. At this time, PCB may be an FPCB (Flexible Printed Circuit Board). At this time, the FPCB disposed with a Hall sensor may be explained as a 'first substrate (600)'. A power may be supplied to the Hall sensor through the first substrate (600), and a signal generated from the Hall sensor may be transmitted to a controller (not shown).

The sensor (411,421,511,521) may be a Hall sensor. The Hall sensor may detect a position of the movable lens (110) by generating a predetermined signal through a magnetic force generated from the sensing magnet (416,426,516,526). In the present exemplary embodiment, a separate sensing unit may be respectively formed at an upper end and a lower end of an optical axis direction relative to a single movable lens. That is, a separate Hall sensor may be respectively formed at an upper end and a lower end of the optical axis direction. As a result, the sensing magnet and the Hall sensor may be mutually adjacently disposed in response to the movable lens (110) moving to an upper side of the optical axis direction, and the sensing magnet and Hall sensor disposed at a lower end may be mutually distanced. Conversely, when the movable lens moves to a lower side of the optical axis direction, the sensing magnet and Hall sensor disposed on an upper side may be mutually distanced, and the sensing magnet and the Hall sensor disposed at a lower end may be mutually closed. That is, as shown in FIG. 3, the linear movement of movable lens to an optical axis direction can be controlled through two sensing units separately disposed at an upper end and a lower end to thereby increase the control accuracy.

The first substrate (600) may be an FPCB. The first substrate (600) may be electrically connected to a controller. An end of the first substrate (600) may be disposed with respective, mutually-spaced-apart Hall sensors applied to each of the upper and lower sensing unit (400, 500) of the first movable lens (111) and the second movable lens (112). A signal generated from each Hall sensor through the first substrate (600) may be transmitted to the controller. Furthermore, one end of the first substrate (600) may be electrically connected to each driving coil in order to drive the first and second movable lenses (111,112). A power may be provided to each Hall sensor and each driving coil through the first substrate (600). The controller may compensate a non-linear section of signal respectively transmitted from the upper and lower sensing units (400, 500), and a current may be applied to a driving coil through the first substrate (600) in response to the signal linearly compensated by the controller to linearly control the movement of the first and second movable lenses (111,112). An end of the first substrate (600) may be disposed at an inside of the fixed member (800). An end of the first substrate (600) may be fixed to an inside of the fixed member (800).

The sensing unit in the present exemplary embodiment may include an upper sensing unit (400) disposed at an upper side of the movable lens (110) and a lower sensing unit (500) disposed at a lower side of the movable lens (110). Each of the upper sensing unit (400) and the lower sensing unit (500) may include a sensing magnet and a sensor. The sensing magnet (416,426) of the upper sensing unit (400) may be disposed at an upper end of the body unit. The sensor (411, 421) of upper sensing unit (400) may be upwardly spaced apart. The sensor (411,421,511,521) may be disposed at an inner upper surface of the fixed member (800) while being disposed on the PCB. The sensor (411,421,511,521) may be fixed disposed on an inside of the fixed member (800). On the contrary, the sensing magnet (516, 526) of lower sensing unit (500) may be disposed at a lower end of the body unit. The sensor (511, 521) of lower sensing unit (500) may be downwardly spaced apart.

The sensor may be disposed at an inner lower surface of fixed member (800) while being disposed on the PCB.

To be more specific, the sensor may include a first sensing unit (410) disposed at an upper side of the first driving unit (200) coupled with the first movable lens (111) and a second sensing unit (510) disposed at a lower side of the first driving unit (200). Furthermore, the sensor may further include a third sensing unit (420) disposed at an upper side of the second driving unit (300) coupled with the second movable lens (112) and a fourth sensing unit (520) disposed at a lower side of the second driving unit (300). That is, the upper sensing unit (400) may be explained as including a first sensing unit (410) disposed at an upper side of first driving unit (200) and a third sensing unit (420) disposed at an upper side of the second driving unit (300), and the lower sensing unit (500) may be explained as including a second sensing unit (510) disposed at a lower side of first driving unit (200) and a fourth sensing unit (520) disposed at a lower side of the second driving unit (300). At this time, the sensing magnet (416) of first sensing unit (410) may be disposed at an upper end of the body unit (210) of first driving unit (200), and the sensor (411) may be upwardly spaced apart. On the other hand, the sensing magnet (516) of second sensing unit (510) may be disposed at a lower end of body unit (210) of first driving unit (200), and the sensor (511) may be downwardly spaced apart. Furthermore, the sensing magnet (426) of third sensing unit (420) may be disposed at an upper end of the body unit (310) of second driving unit (300), and the sensor (421) may be upwardly spaced apart. On the other hand, the sensing magnet (526) of fourth sensing unit (520) may be disposed at a lower end of body unit (310) of second driving unit (300) and the sensor (521) may be downwardly spaced apart.

The present exemplary embodiment may include a first movable lens (111) and a second movable lens (112), and as a result, may include first to fourth sensing units (410,420, 510,520). At this time, a sensor of each sensing unit may be disposed on an FPCB (600), as illustrated in FIG. 5. The FPCB (600) may be disposed at an inside of the fixed member (800). The FPCB (600) may fix the sensor to the fixed member (800) by being fixedly disposed on the fixed member (800).

Figure 6:
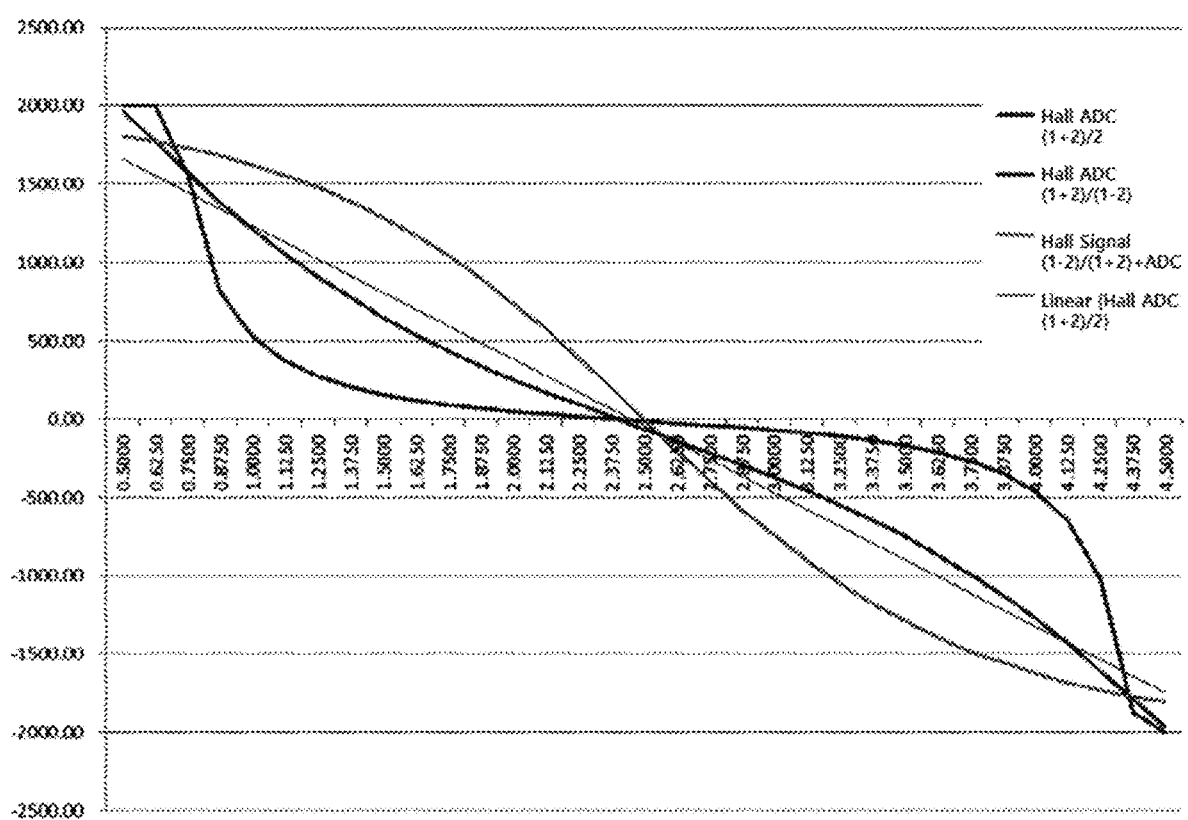
FIG. 6 is a graph showing an improved linear characteristic of a Hall sensor output of a camera module according to an exemplary embodiment of the present invention.

That is, separately disposed upper and lower sensing units (500) are disposed on an upper side and a lower side of movable lens (110), such that although, when the movable lens (110) is upwardly moved, the sensing magnet of lower sensing unit (500) and the sensor are mutually distanced to approach an non-linear section in an output thereof, the sensing magnet of the upper sensing unit (400) and the sensor are mutually closed at the same time to allow an output to approach a linear section, thereby compensating the non-linear section as shown in FIG. 6.

Moreover, as shown in FIG. 5, the camera module may include a fixed module (800). The fixed member (800) may be disposed at an inside of a housing (not shown). The fixed member (800) may be fixed to an inside of the housing. The fixed member (800) may be formed therein with a predetermined size of space in which a lens is accommodated. The first movable lens (111) and the second movable lens (112) may be moved to an optical axis direction while being accommodated into an inside of the fixed member (800). An inner upper end of the fixed member (800) may be coupled by respective upper ends of first guide rail (220) and the second guide rail (320). An inner lower end of the fixed member (800) may be coupled by respective lower ends of the first guide rail (220) and the second guide rail (320). An inner upper end of the fixed member (800) may be formed with an upper protrusion (811, 821) that restricts an upward movement of each driving unit by being contacted to an upper stopper (261, 361) formed on each body unit (210, 310). An inner lower end of the fixed member (800) may be formed with a lower stopper (812, 822) that restricts a downward movement of each driving unit by being contacted with a lower stopper (262,362). Furthermore, both lateral walls of inner side of the fixed member (800) may be disposed with driving coil (250,350). First and second driving units (200, 300) coupled by a driving magnet may be formed to face each driving coil. Furthermore, an inside of the fixed member (800) may be respectively disposed with sensors (411,421,511,521) mounted on the said FPCB (600).

The camera module may further comprise a controller, an image sensor (not shown), a PCB (not shown) mounted with the image sensor and a filter (not shown).

The controller may generate a signal for driving the driving units (200,300). Application of a current to a driving coil in response to the said signal may move the movable lens to an optical axis direction through interaction with a magnetic field of the driving magnet. Furthermore, a signal of a Hall sensor generated respectively from the upper sensing unit (400) and the lower sensing unit (500) respectively disposed on upper and lower end of optical axis direction of the first driving unit (200) or the second driving unit (300) may be detected and linearly compensated as shown in FIG. 6, through which the movement of the movable lens can be linearly controlled.

The camera module may include an image sensor. The image sensor may be disposed on the PCB. The PCB mounted with an image sensor may be explained as a "second substrate". The image sensor may be electrically connected to a second substrate (not shown). For example, the image sensor may be coupled to the second substrate by way of SMT (Surface Mounting Technology). In another example, the image sensor may be coupled to a second substrate by way of flip chip technology. The image sensor may be so arranged as to be matched to a lens through an optical axis. That is, an optical axis of image sensor and an optical axis of a lens may be aligned. The image sensor can convert a light irradiated on an effective image region of an image sensor to an electric signal. The image sensor may be any one of a CCD(charge coupled device), an MOS(metal oxide semi-conductor), a CPD and a CID.

The camera module may include a second substrate (not shown). The second substrate may be disposed with an image sensor. The second substrate may be electrically connected to an image sensor.

The camera module may include a filter. The filter may include an infrared filter. The infrared filter may inhibit a light of infrared region from being incident on an image sensor. The infrared filter may be interposed between a lens and an image sensor.

As elaborated in the foregoing discussion, the present invention has advantageous effects in that a plurality of sensors, each mutually spaced apart relative to a single movable lens (110) to an optical axis direction, is disposed to increase linearity of an output of a Hall sensor by compensating a non-linear section of each output of Hall sensor, whereby control easiness of a lens driving unit can be improved in response to the increased controlled linear section.

Furthermore, the present invention has advantageous effects in that accuracy and resolution of a driving unit are improved in response to improved performance at an application end, and software calibration is eased in response to decreased non-linear sections.

Although the foregoing discussion has explained a sensing unit being disposed respectively on an upper end and a lower end of a movable lens, it should be apparent that a detailed disposed position of each spaced-apart sensing unit may be adjustable within a scope of a driving linearity of a movable lens being obtained. Furthermore, although the foregoing discussion has explained a first group lens and a second group lens as being a movable lens and a third group lens as being a fixed lens, it should be also apparent to the skilled in the art that a relative arrangement between a lens group moving for performing a zooming function and a fixed lens group may be changed by the intention of a designer.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A camera module comprising:
    a moving lens including a first moving lens movably arranged in an optical axis direction, and a second moving lens arranged under the first moving lens;
    a fixed lens arranged under the moving lens;
    a first driving unit coupled to one side of the first moving lens to move the first moving lens in the optical axis direction;
    a second driving unit coupled to one side of the second moving lens to move the second moving lens in the optical axis direction;
    a first sensing unit disposed on the first driving unit;
    a second sensing unit disposed under the first driving unit;
    a third sensing unit disposed on the second driving unit; and
    a fourth sensing unit disposed under the second driving unit,
    wherein the first sensing unit includes a first sensing magnet disposed on an upper end of the first driving unit, and a first sensor spaced apart from the first sensing magnet in an optical axis direction, wherein the second sensing unit includes a second sensing magnet disposed at a lower end of the first driving unit, and a second sensor spaced apart in the optical axis direction from the second sensing magnet, wherein the third sensing unit includes a third sensing magnet disposed at an upper end of the second driving unit, and a third sensor spaced apart in the optical axis direction from the third sensing magnet, and wherein the fourth sensing unit includes a fourth sensing magnet disposed at a lower end of the second driving unit, and a fourth sensor spaced apart in the optical axis direction from the fourth sensing magnet.

2. The camera module of claim 1, wherein the first driving unit includes a first guide rail extending along an optical axis direction and a first guide unit slidable along an outer circumferential surface of the first guide rail, and the second driving unit includes a second guide rail extending along the optical axis direction and a second guide unit slidable along an outer circumferential surface of the second guide rail.

3. The camera module of claim 2, wherein upper and lower ends of the first guide rail and upper and lower ends of the second guide rail are respectively coupled to a fixing member.

4. The camera module of claim 2, wherein each of the first guide unit or the second guide unit includes a guide wheel in which a recess is formed to correspond to an outer circumferential surface of the first guide rail or the second guide rail.

5. The camera module of claim 2, wherein the first guide rail or the second guide rail has a rod shape having a circular cross section, and the first guide unit or the second guide unit is a pair of balls disposed along the circumference of the first guide rail or the second guide rail.

6. The camera module of claim 2, wherein a first coupling member is coupled to a second side of the first moving lens and guided along the second guide rail, and a second coupling member is coupled to a second side of the second moving lens and guided along the first guide rail.

7. The camera module of claim 1, wherein the first driving unit includes a first main body in which the first moving lens is disposed inside, a first magnet disposed on an outer surface of the first main body, and a first driving coil disposed opposite to the first magnet.

8. The camera module of claim 7, wherein the second driving unit includes a second main body in which the second moving lens is disposed inside, a second magnet on an outer surface of the second main body, and a second driving coil disposed opposite to the second magnet.

9. The camera module of claim 8, comprising a yoke disposed at an outside of the first driving coil and the second driving coil.

10. The camera module of claim 8, wherein a stopper is disposed on upper and lower portions of the first main body, and a protrusion is disposed on an inner surface of a fixing member facing the stopper.

11. The camera module of claim 8, wherein a stopper is disposed on upper and lower portions of the second main body, and a protrusion is disposed on an inner surface of a fixing member facing the stopper.

12. A camera module comprising:

a moving lens including a first moving lens movably arranged in an optical axis direction, and a second moving lens arranged under the first moving lens;

a fixed lens arranged under the moving lens;

a first driving unit coupled to one side of the first moving lens to move the first moving lens in the optical axis direction;

a second driving unit coupled to one side of the second moving lens to move the second moving lens in the optical axis direction;

a first sensing unit disposed on the first driving unit;

a second sensing unit disposed under the first driving unit;

a third sensing unit disposed on the second driving unit; and a fourth sensing unit disposed under the second driving unit, wherein the first driving unit includes a first guide rail extending along an optical axis direction and a first guide unit slidable along an outer circumferential surface of the first guide rail, wherein the second driving unit includes a second guide rail extending along the optical axis direction and a second guide unit slidable along an outer circumferential surface of the second guide rail, wherein upper and lower ends of the first guide rail and upper and lower ends of the second guide rail are respectively coupled to a fixing member, wherein the first sensing unit comprises a first sensor, wherein the second sensing unit comprises a second sensor, wherein the third sensing unit comprises a third sensor, wherein the fourth sensing unit comprises a fourth sensor, and wherein the first sensor, the second sensor, the third sensor, and the fourth sensor are disposed at one end of a flexible circuit board.

13. The camera module of claim 12, wherein the first sensor, the second sensor, the third sensor, and the fourth sensor include a hall sensor.

14. The camera module of claim 12, wherein the flexible circuit board is disposed inside the fixing member.

15. A camera module comprising:

a moving lens including a first moving lens movably arranged in an optical axis direction, and a second moving lens arranged under the first moving lens;

a fixed lens arranged under the moving lens;

a first driving unit coupled to one side of the first moving lens; and a second driving unit coupled to one side of the second moving lens, wherein the first driving unit includes a first guide rail extending along an optical axis direction and a first guide unit slidable along an outer circumferential surface of the first guide rail, the second driving unit includes a second guide rail extending along the optical axis direction and a second guide unit slidable along an outer circumferential surface of the second guide rail, a first coupling member is coupled to a second side of the first moving lens and guided along the second guide rail, and a second coupling member is coupled to a second side of the second moving lens and guided along the first guide rail, wherein the first guide unit is a pair of balls disposed along the outer circumferential surface of the first guide rail.

16. The camera module of claim 15, wherein upper and lower ends of the first guide rail and upper and lower ends of the second guide rail are respectively coupled to a fixing member.

17. The camera module of claim 15, comprising a first sensing unit disposed on the first driving unit, a second sensing unit disposed under the first driving unit, a third sensing unit disposed on the second driving unit, and a fourth sensing unit disposed under the second driving unit.

18. The camera module of claim 15, wherein the first driving unit includes a first main body in which the first moving lens is disposed inside, a first magnet disposed on an outer surface of the first main body, and a first driving coil disposed opposite to the first magnet, and wherein the second driving unit includes a second main body in which the second moving lens is disposed inside, a second magnet on an outer surface of the second main body, and a second driving coil disposed opposite to the second magnet.

19. The camera module of claim 18, wherein a first stopper is disposed on upper and lower portions of the first main body, a first protrusion is disposed on an inner surface of a fixing member facing the first stopper, a second stopper is disposed on upper and lower portions of the second main body, and a second protrusion is disposed on an inner surface of a fixing member facing the second stopper.

\* \* \* \* \*